United States Patent [19]
Kato et al.

[11] Patent Number: 6,082,761
[45] Date of Patent: Jul. 4, 2000

[54] SIDE AIRBAG DEVICE

[75] Inventors: Hisaaki Kato, Anjo; Toshinori Tanase, Gifu-ken; Yasuo Ochiai; Hiroshi Yasuda, both of Aichi-ken; Hiroki Nakajima, Nagoya, all of Japan

[73] Assignees: Toyoda Gosei Co., Ltd.; Toyota Jidosha Kabushiki Kaisha, both of Aichi-ken, Japan

[21] Appl. No.: 09/008,503

[22] Filed: Jan. 16, 1998

[30] Foreign Application Priority Data

Jan. 24, 1997 [JP] Japan ................................ 9-011558
Jul. 23, 1997 [JP] Japan ................................ 9-197156

[51] Int. Cl.[7] ............................. B60R 21/16; B60R 21/22
[52] U.S. Cl. ..................................... 280/730.2; 280/728.2
[58] Field of Search ............................... 280/728.2, 730.2

[56] References Cited

U.S. PATENT DOCUMENTS

| | | | |
|---|---|---|---|
| 2,834,606 | 5/1958 | Bertrand | 280/150 |
| 4,394,033 | 7/1983 | Goetz et al. | 280/736 |
| 5,498,029 | 3/1996 | Mossi et al. | 280/741 |
| 5,678,852 | 10/1997 | Brown et al. | 280/730.2 |
| 5,803,486 | 9/1998 | Spencer et al. | 280/728.2 |
| 5,810,390 | 9/1998 | Enders et al. | 280/730.2 |
| 5,857,696 | 1/1999 | Inoue et al. | 280/728.2 |
| 5,918,898 | 7/1999 | Wallner et al. | 280/728.2 |

FOREIGN PATENT DOCUMENTS

| | | |
|---|---|---|
| 0 795 445 | 9/1997 | European Pat. Off. . |
| 29605896 | of 0000 | Germany . |
| 296 05 897 U | 7/1996 | Germany . |
| 296 05 896 U | 9/1996 | Germany . |
| 296 13 781 U | 11/1996 | Germany . |
| 296 14 201 U | 11/1996 | Germany . |
| 06227340 | 8/1994 | Japan . |
| 09123866 | 5/1997 | Japan . |
| WO 96/26087 | 8/1996 | Sweden . |
| 2 293 355 | 3/1996 | United Kingdom . |
| 2293355 | 3/1996 | United Kingdom . |
| WO 96/09193 | 3/1996 | WIPO . |

*Primary Examiner*—Brian L. Johnson
*Assistant Examiner*—Michael Britton
*Attorney, Agent, or Firm*—Pillsbury Madison & Sutro Intellectual Property Group

[57] ABSTRACT

A side air bag device has an air bag and a substantially cylindrical inflator for supplying inflation gas to the air bag. The air bag includes a cloth bag and is installed in a vehicle interior in a folded state along the edge of a door opening. The air bag deploys so as to cover the door opening when it inflates. The air bag has a substantially cylindrical tubular gas inflow portion. This gas inflow portion is connected to the inflator so that it covers the inflator. The gas inflow portion is clamped to the outer circumferential surface of the inflator. With a side air bag device according to the invention it is not necessary to use a long pipe that from the inflator and it is possible to increase the freedom of installation of the device and also reduce its weight and cost.

10 Claims, 15 Drawing Sheets

SIDE AIRBAG DEVICE

BACKGROUND OF THE INVENTION

This application claims priority based on Japanese Patent Application No. Hei 9-011558 filed Jan. 24, 1997 and Japanese Patent Application No. Hei 9-197156, filed Jul. 23, 1997, the contents of which are both expressly incorporated herein by reference.

FIELD OF THE INVENTION

This invention relates to a side air bag device to be installed in the interior of a vehicle along the margin or edge of a door opening. In the event of a crash, the side air bag inflates so as to cover the door opening and restrain the head of the vehicle's occupant.

DESCRIPTION OF THE RELATED PRIOR ART

A known side air bag device MO has an air bag 1 and an inflator 7, as shown in FIG. 1. Air bag 1 is fitted in a folded state along the edge of a door opening W on the interior side of a vehicle housing. Inflator 7 supplies a gas for inflating air bag 1.

Air bag 1 is made of a flexible cloth material. Air bag 1 has a plurality of cushion portions 2 that inflate upon deployment of air bag 1. Air bag 1 also has flat portions 4, which do not inflate, and a pipe insertion portion 5. Flat portions 4 are disposed at the vehicle's front side and at the vehicle's rear side of air bag 1. Pipe 6 is inserted into insertion portion 5. Pipe 6 carries the inflation gas from inflator 7 to cushion portions 2.

Cushion portions 2 are divided from each other by seams 3. Seams 3 are formed by stitching together portions of the inner and outer side walls of air bag 1. Seams 3 extend substantially vertically from the upper edge side to the lower edge side of air bag 1.

This side air bag device MO operates in the following way. First, inflation gas from inflator 7 passes through pipe 6. This inflation gas then enters cushion portions 2 through holes (not shown) that are formed in pipe 6. Consequently, cushion portions 2 inflate. As a result of the inflation of cushion portions 2, a tension arises in the air bag 1 along a line L—L that extends from the lower side of the edge of the door opening W to an upper side that is diagonally thereabove. This tension line L—L makes it possible for air-bag 1 to restrain the head of the vehicle's occupant.

It has been essential to make tension line L—L arise upon the inflation of air bag 1 for the reason that follows. Air bag 1 is installed in a roughly L-shaped area that constitutes the margin or edge of the door opening W. Consequently, if a tension line L—L does not arise upon the inflation of air bag 1, even if air bag 1 contacts the occupant's head, air bag 1 will simply move. As a result, air bag 1 will not restrain the occupant's head.

In side air bag device MO, the inflation gas from inflator 7 is supplied to air bag 1 using pipe 6, which is inserted into insertion portion 5. Consequently, pipe 6 is long and the freedom of installation of side air bag device MO is limited. This arrangement also results in a heavy side air bag device MO.

SUMMARY OF THE INVENTION

It is an object of the invention to provide a side air bag device that: (a) does not use a pipe extending from the inflator; (b) has increased freedom of installation; and (c) has reduced weight. It is also an object of the invention to provide a side air bag device in which it is possible to make the inflation gas flow smoothly into the air bag without using a long pipe that extends from the inflator.

The foregoing objects of the invention are achieved by a side air bag device that has an air bag and a substantially cylindrical inflator that supplies inflation gas to the air bag. The air bag is a cloth bag that is folded when installed in a vehicle interior along the edge of a door opening and covers the door opening upon deployment. The air bag has a substantially cylindrical tubular gas inflow portion. This gas inflow portion is connected to the inflator and is clamped onto an outer circumferential surface of the inflator.

With a side air bag device of this construction, it is not necessary to use a pipe that projects a long way from the inflator. As a result, the weight of the side air bag device can be reduced. Also, a rigid pipe does not have to be used. Furthermore, the air bag remains flexible enough to be foldable. Therefore, the gas inflow portion of the air bag can be bent and the freedom of installation of the side air bag device is increased.

This side air bag device is so constructed that the gas inflow portion is connected to the inflator using a mounting bracket. The mounting bracket has a mounting portion that can be fixed to the vehicle housing and a substantially cylindrical tubular clamping surface with an internal diameter that can be reduced. The clamping surface is fitted around the gas inflow portion that covers the inflator and then the internal diameter of the clamping surface is reduced. In this way, the gas inflow portion is clamped onto the outer circumferential surface of the inflator. The gas inflow portion and the inflator are attached to the vehicle housing by fixing the mounting portion thereto.

With the construction described above, a good seal is created by reducing the diameter of the clamping surface, and thus clamping the gas inflow portion onto the outer circumferential surface of the inflator. Therefore, in a side air bag device of the above construction, it is possible to create a seal between the air bag and the inflator and to easily attach the air bag to the inflator. Also, the mounting bracket itself has a mounting portion that can be attached to the vehicle housing. Therefore, by attaching the mounting portion to the housing it is possible to mount the inflator having the gas inflow portion assembled thereto to the vehicle housing easily.

The inflator may have a substantially cylindrical inflator housing having a gas delivery opening in a circumferential face thereof. The inflator may also have: (a) a substantially cylindrical tubular diffuser having a mating portion for mating with the inflator housing; (b) a gas emission opening for emitting inflation gas therethrough at different ends; and (c) an intermediate portion disposed between the mating portion and the gas emission opening so as to face the gas delivery opening, which has an inner circumferential surface.

With this inflator, even though the gas delivery opening is disposed in a circumferential face of the inflator housing, the inflation gas is guided smoothly into the gas inflow portion of the air bag through the gas emission opening of the diffuser. As a result, even when the air bag is fitted in a folded state along the long and narrow area of the door opening edge, the air bag can still inflate smoothly. In this case, if the gas inflow portion of the air bag is clamped onto the outer circumferential surface of the diffuser, it is not necessary for the gas inflow portion to be made long. That is, the gas inflow portion can be made using a reduced amount of material.

The mating portion of the diffuser may be plastically deformed against the inflator housing so as to provide an irregularity in the outer circumferential surface of the diffuser. The gas inflow portion of the air bag is then clamped onto the area of the outer circumferential surface of the diffuser where the irregularity is provided. When this construction is used, the gas inflow portion is less likely to detach from the diffuser because of increased frictional resistance. As a result, it is possible to increase the strength with which the air bag is attached to the inflator.

The above-mentioned object of the invention is achieved by a side air bag device having an air bag and an inflator that supplies inflation gas to the air bag. The air bag is a cloth bag that is folded when installed in a vehicle interior along the edge of a door opening and covers the door opening upon deployment. The inflator has a substantially cylindrical inflator housing having a gas delivery opening in a circumferential face thereof. The inflator also has: (a) a substantially cylindrical tubular diffuser having a mating portion for mating with the inflator housing; (b) a gas emission opening for gas to be emitted therethrough at different ends; and (c) an intermediate portion disposed between the mating portion and the gas emission opening so as to face the gas delivery opening, which has an inner circumferential surface. The mating portion of the diffuser is formed as a female screw thread, which is formed on an inner circumferential surface of the diffuser. The inflator housing has a male screw thread on an outer circumferential surface thereof for mating with the female screw thread of the mating portion. In other words, the diffuser is coupled to the inflator by screwing the male and female screw threads together.

With a side air bag device of this construction, the diffuser is fixed to the outer circumferential surface of the inflator housing by the use of the screw threads. Because of this arrangement, the positional relationship between the diffuser and inflator housing is fixed at all times and it is possible to align the axis of the diffuser and the inflator housing. Stated differently, the gap between the outer circumferential surface of the inflator housing and the inner circumferential surface of the diffuser through which the inflation gas flows out can be made uniform along the outer circumferential surface of the inflator housing. As a result, variation does not arise in the direction in which the inflation gas flows or the distribution of amount of flow around the inflator housing. Thus, the inflation gas flows uniformly through the gas emission opening side of the diffuser.

Therefore, in a side air bag device having the construction described above, even when the air bag is folded in the long and narrow area of the edge of a door opening, the air bag can be made to inflate smoothly. Also, the diffuser can be easily fixed to the inflator housing just by simply screwing together the mating screw threads. As a result, it is possible to reduce the manufacturing labor and manufacturing cost of the side air bag device.

Also, since the diffuser is fixed to the inflator housing by screwing screw threads together, it is possible to prevent leakage of inflation gas through the mating portion of the diffuser, and thus more effective use of the inflation gas is achieved. Further, even if the inflator is one wherein the gas delivery opening is disposed in the outer circumferential surface at the end of the inflator housing that is opposite from the gas emission opening of the diffuser, the air bag can be inflated smoothly. This is because the inflation gas can be made to flow through the gas emission opening side of the diffuser uniformly.

Preferably, gripping surfaces are formed in the outer circumferential surfaces of the inflator housing and the diffuser so that the inflator housing and the diffuser can both be gripped when the screw threads are being joined together. These gripping surfaces make it possible to firmly grip the substantially cylindrical inflator housing and the cylindrical diffuser. As a result, it is easier to fix the diffuser to the inflator housing, and the labor and manufacturing cost of the side air bag device are reduced.

DETAILED DESCRIPTION OF PREFERRED EMBODIMENTS

The invention will now be described with reference to the specific preferred embodiments shown in the accompanying drawings. The subject invention, however, is not limited to the preferred embodiments described herein, and various changes and modifications are of course possible within the spirit and scope of the subject invention.

A side air bag device M1 of one embodiment of the subject invention is disposed in a vehicle interior and extends along the edge of a door opening W from below a front pillar to the rear side of a roof side rail, as shown in FIGS. 2–5. Side air bag device M1 has an air bag 11 and an inflator 18.

Air bag 11 is folded and fitted in the vehicle interior along the edge of the door opening W above the belt line BL (i.e., the line of the lower side of the window frame F in the door D). In other words, air bag 11 is fitted in a folded state along the front pillar and the roof side rail.

Figure 6:
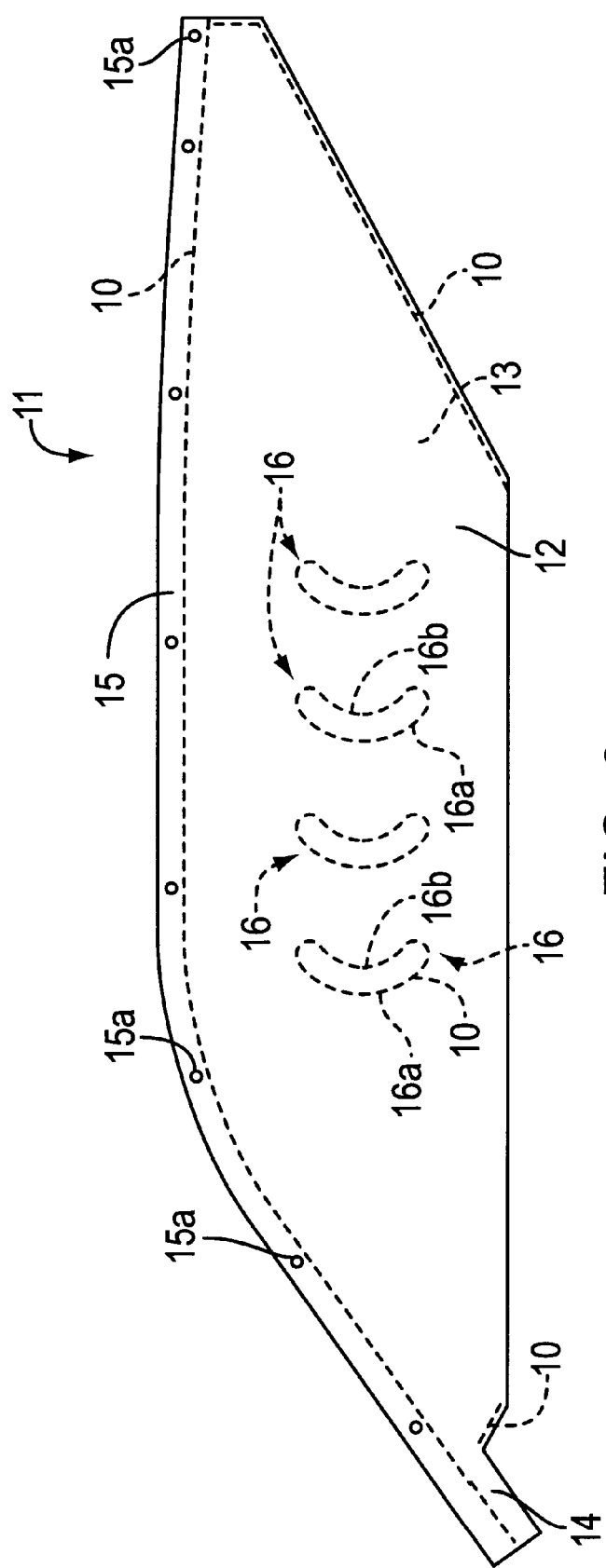
FIG. 6 is a view showing the air bag upon inflation.

As shown in FIG. 6, air bag 11 has an inner side wall portion 12 and an outer side wall portion 13. The shape of air bag 11 when deployed is substantially that of a four-cornered flat bag. Air bag 11 also has in its lower side a substantially cylindrical tubular gas inflow portion 14.

Air bag 11 of this embodiment is manufactured from a single sheet of cloth. The shape of the cloth is the shape of a feather having as an approximate centerline a lower edge that is common to inner side wall portion 12 and outer side wall portion 13. Air bag 11 is made in the shape of a bag by the cloth being folded double along this approximate centerline and then having the other edges stitched with a stitching thread 10, which may be a polyester thread. Inner side wall portion 12 and outer side wall portion 13 that overlaps on the upper edge side of the stitching of air bag 11 forms a fixable portion 15 that is to be fixed to the housing 28 of the vehicle. Fixable portion 15 contains fixing holes 15a. The cloth of air bag 11 is made of a flexible woven fabric of polyamide, polyester, or the like.

Figure 5:
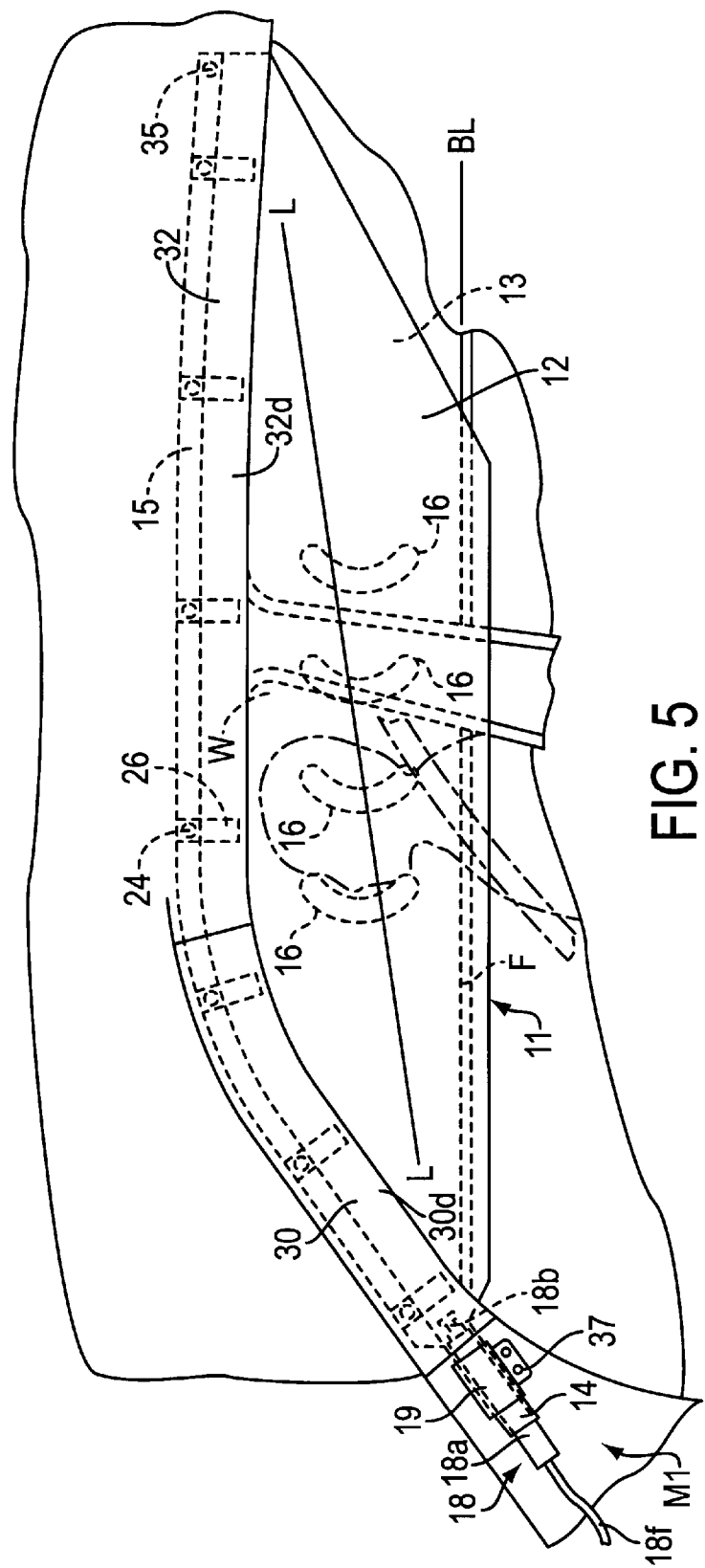
FIG. 5 is a view showing the side air bag device when operated.

As shown in FIGS. 5 and 6, seams 16, which form a tension line L—L in air bag 11 when inflated, are formed with the use of stitching thread 10, which may be a polyester thread. In particular, seams 16 are each formed by stitching together inner side wall portion 12 and outer side wall portion 13. The stitching is performed in the shape of a closed loop. Each seam 16 has a curved shape bowing outward to gas inflow portion 14 side of air bag 11 and has a convex portion 16a and a concave portion 16b. In the case of this embodiment, four seams 16 are arranged in a line in the front to rear direction of the vehicle and centrally in the vertical direction of inflated air bag 11.

Figure 3:
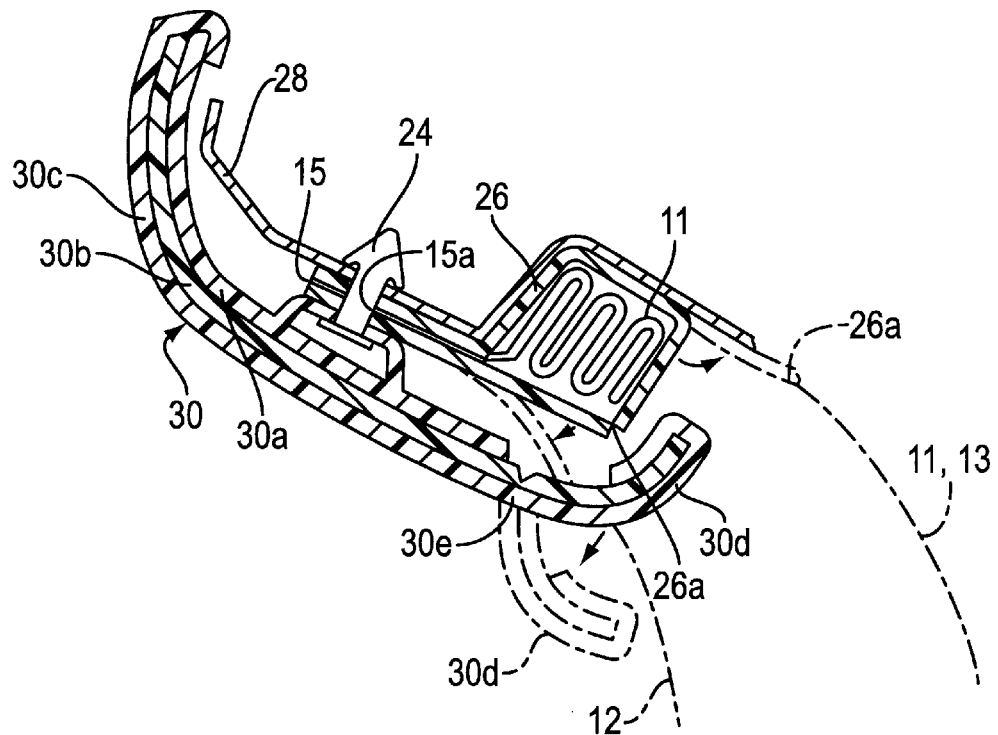
FIG. 3 is an enlarged sectional view along the line III—III in FIG. 2.
Figure 4:
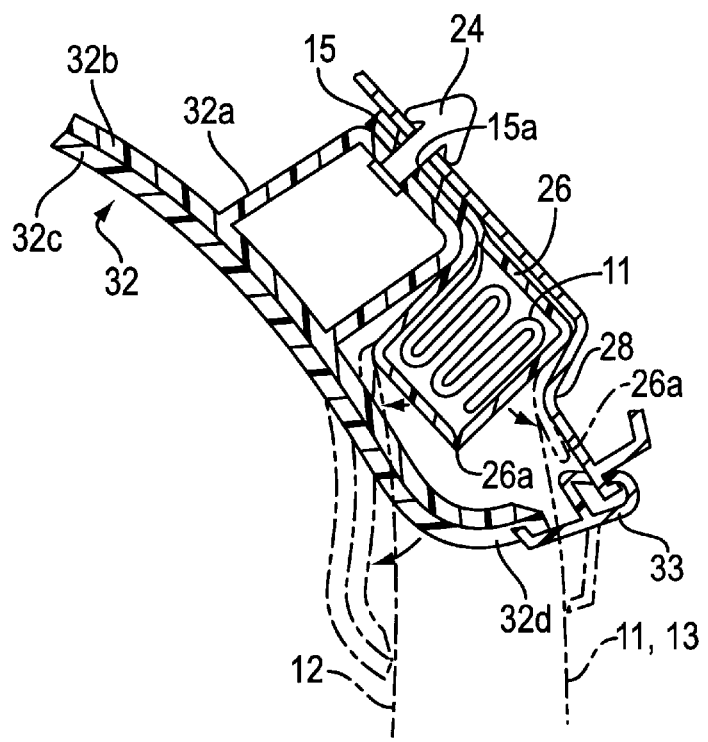
FIG. 4 is an enlarged sectional view along the line IV—IV in FIG. 2.

Air bag 11 is folded in bellows form and is fitted along the edge of the door opening W as shown in FIGS. 3 and 4. Air bag 11 is covered by a closure 30 on the front pillar side and by a roof trim member 32 on the roof rail side.

Closure 30 is made of a synthetic resin such as ABS or polypropylene. Closure 30 has a mounting portion 30a, a base 30b, and a facing 30c. Closure 30 also has a door portion 30d in which an integral hinge 30e is provided. Door portion 30d is pushed open by air bag 11 upon inflation. Closure 30 is fixed to housing 28 with clips 24, bolts, or other attachment devices. Clips 24 or bolts pass through fixing holes 15a in air bag 11 and also pass through tie belts 26, which are discussed below. Clips 24, bolts, or other attachment devices perform the role of fixing air bag 11 to housing 28.

Roof trim member 32 is made of a synthetic resin such a urethane or polypropylene. Roof trim member 32 has a mounting portion 32a, a base 32b, and a facing 32c. Roof trim member 32 is fastened to housing 28 by clips 24, bolts, or other attachment devices. Roof trim member 32 has an edge 32d engaged with a door trim 33. Door trim 33 is connected to housing 28. When air bag 11 inflates, edge 32d is pushed so as to detach from door trim 33.

When folded, air bag 11 is tied in predetermined locations by tie belts 26, which are made of a synthetic resin. Each tie belt 26 has a thin breaking portion 26a. Breaking portion 26a breaks when air bag 11 inflates. Tie belts 26 are fixed to the housing 28 by clips 24, bolts, or other attachment devices.

At the rear end of air bag 11, a bolt 35 is screwed into the housing 28 and passes through one of the fixing holes 15a. The rear end of air bag 11 is attached to the housing 28 by bolt 35, without the use of a tie belt 26. The front end of air bag 11 is attached to the housing 28 by the use of a mounting bracket 19. In addition, gas inflow portion 14 is fitted around inflator 18 and is clamped onto the outer circumferential surface of inflator 18 by mounting bracket 19.

Figure 1:
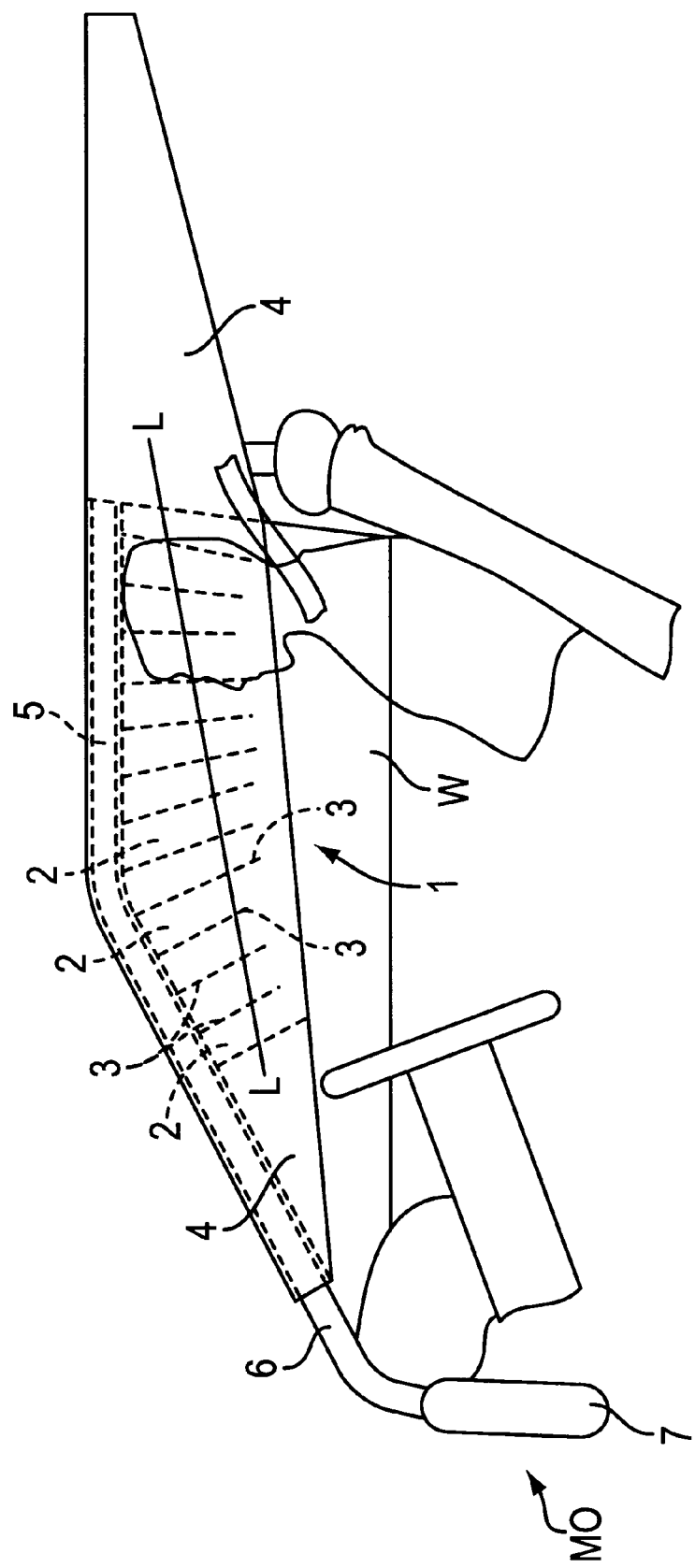
FIG. 1 is a view showing an air bag of the related prior art.
Figure 2:
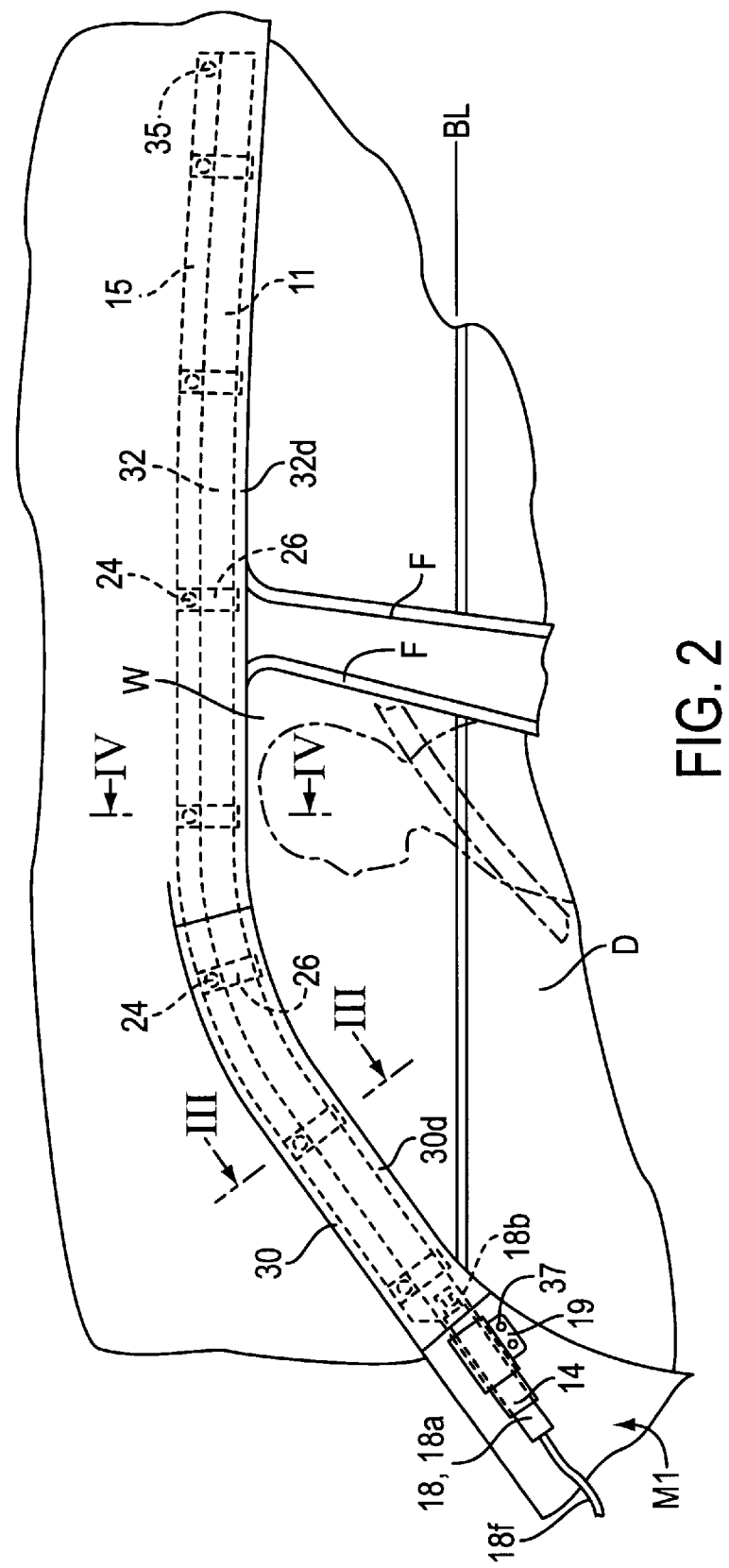
FIG. 2 is a view showing a side air bag device of one embodiment of the invention.
Figure 7:
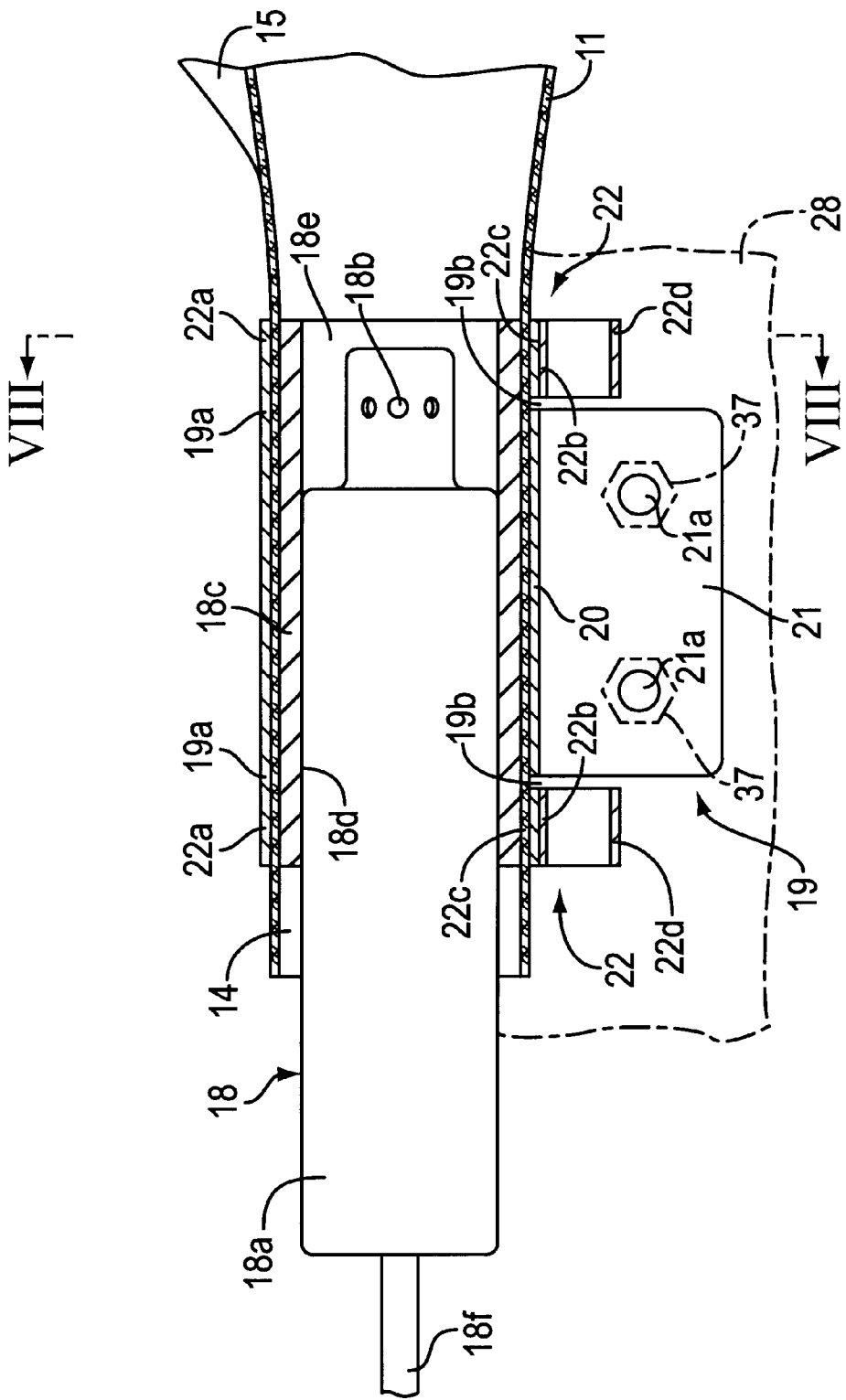
FIG. 7 is an enlarged longitudinal sectional view of an inflator area.
Figure 8:
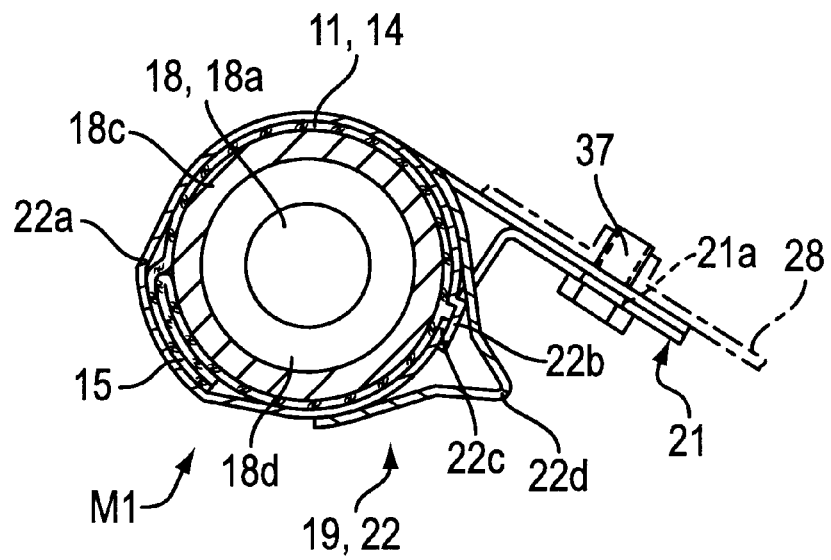
FIG. 8 is a sectional view along the line VIII—VIII in FIG. 7.

As shown in FIGS. 2, 7, and 8, inflator 18 is disposed in a lower portion of the front pillar below belt line BL. Inflator 18 is made up of an inflator housing 18a and a diffuser 18c. Inflator housing 18a is substantially cylindrical. Inflator housing 18a has gas delivery openings 18b through which inflation gas is discharged. Diffuser 18c is made of sheet metal and is of a substantially cylindrical tubular shape such that it surrounds gas delivery openings 18b. The lower end of diffuser 18c is a mating portion 18d that is connected to inflator housing 18a. In this embodiment, mating portion 18d is connected to inflator housing 18a by press-fitting. The upper end of diffuser 18c forms a gas emission opening 18e through which inflation gas flows. Inflator 18 having gas inflow portion 14 fitted over it is mounted to the housing 28 by use of mounting bracket 19. Lead wire 18f inputs a predetermined electrical signal to inflation housing 18a to cause inflation gas to be discharged through gas delivery openings 18b.

Figure 9:
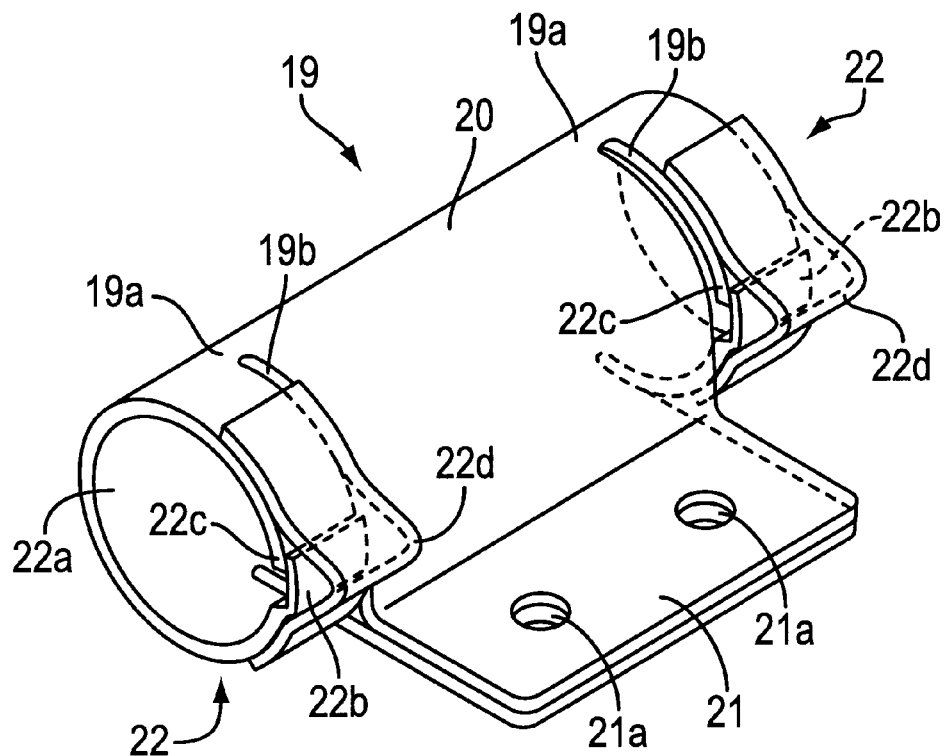
FIG. 9 is a perspective view of a mounting bracket.

Mounting bracket 19 is made of bent sheet metal. As shown in FIGS. 7–9, mounting bracket 19 has a tubular portion 20, a mounting portion 21, and holding portion 22. Tubular portion 20 covers diffuser 18c, which has gas inflow portion 14 fitted over it. Mounting portion 21 is formed so as to extend from tubular portion 20 and has mounting holes 21a. Holding portions 22 are disposed at the ends of tubular portion 20. Connecting portions 19a have slits 19b that are disposed between holding portions 22, which are substantially cylindrical and which are constructed so that their internal diameters can be reduced. The internal diameter of tubular portion 20 is substantially equal to or slightly larger than the external diameter of gas inflow portion 14 when it is fitted over diffuser 18c of inflator 18. When gas inflow portion 14 is fitted over diffuser 18c, fixable portion 15 of air bag 11 is bent downward as is shown in FIG. 8.

Each holding portion has a clamping surface 22a and a linking portion 22d. Each clamping surface 22a is shaped like a belt curled to form a tube and has a substantially cylindrical inner circumferential surface. Clamping surface 22a has an end portion 22b that is bent outward and an end portion 22c that overlaps with the inner side of end portion 22b. Clamping surface 22a is constructed so that by pinching and plastically deforming linking portion 22d it is possible to reduce the internal diameter of the inner circumferential surface of clamping surface 22a. In this embodiment, end portion 22b and 22c are disposed on the side opposite connecting portion 19a.

The internal diameter of clamping surfaces 22a before linking portions 22d are pinched is slightly larger than the external diameter of gas inflow portion 14 when it has been fitted over diffuser 18c. The internal diameter of clamping surface 22a when linking portion 22d has been pinched is smaller than the external diameter of gas inflow portion 14 when it is fitted over diffuser 18c. These dimensional settings are made based on the length of linking portion 22d and the shapes and dimensions of end portion 22b and the shapes and dimensions of end portion 22b and 22c.

Mounting bracket 19 is used in the following manner. First, gas inflow portion 14 is fitted over diffuser 18c of inflator 18 so that diffuser 18c is covered by gas inflow portion 14. At this time, fixable portion 15 is bent downward. Then, tabular portion 20 and holding portion 22 of mounting bracket 19 are fitted around gas inflow portion 14.

Linking portions 22d are then pinched and plastically deformed via the use of pliers or the like. When this is done, the internal diameters of clamping surfaces 22a are reduced. Then, since linking portions 22d are plastically deformed, this internal diameter is maintained. Consequently, gas inflow portion 14 of air bag 11 after being fitted over diffuser 18c is clamped onto the outer circumferential surface of diffuser 18c so as to create a good seal. Mounting bolts 37 are screwed into the housing 28 through mounting holes 21a in mounting portion 21. In this way, inflator 18 with gas inflow portion 14 assembled thereto can be easily mounted to the housing 28.

With the side air bag device M1 of this embodiment, it is not necessary to use a pipe that projects a long way from inflator 18. As a result, the weight of the air bag device is reduced. Also, a rigid pipe is not required, but yet air bag 11 remains flexible enough to be foldable. In place of a pipe, gas inflow portion 14 of air bag 11 can be bent and increased freedom and ease of installation of the side air bag device M1 is obtained.

Also, with the side air bag device M1 of this embodiment, by the use of mounting bracket 19 it is easy to attach air bag 11 to inflator 18 and still obtain a good seal. Furthermore, with the side air bag device M1, mounting inflator 18 to the housing 28 is made easier as a result of the use of mounting bracket 19.

When inflator 18 is attached to the housing 28 together with gas inflow portion 14 via mounting bracket 19, air bag 11 is folded and tied with tie belts 26. Mounting portion 21 is fixed to the housing 28. Tie belts 26 are also fastened to the housing 28 using clips 24 bolts or another attachment device. In other words, inflator 18 as fitted with gas inflow portion 14 is mounted to the housing 28, the remainder of air bag 11 is also mounted to the housing 28 at the same time.

The air bag device M1 of this embodiment operates in the following way. First, inflation gas is discharged through gas delivery openings 18b of inflator 18. This inflation gas is guided into the diffuser 18c and is emitted through gas emission opening 18e. Then the inflation gas flows through gas inflow portion 14 and into air bag 11. This flow of gas causes the folded air bag 11 to inflate and break breaking portion 26a of tie belts 26. Air bag 11 pushes open door portion 30d of closure 30. Air bag 11 also pushes open edge 32d of roof trim member 32. As a result, air bag 11 inflates so as to block the door opening W.

In the side air bag device M1 of this embodiment, gas delivery openings 18b of inflator 18 are covered by substantially cylindrical diffuser 18c, which has a gas emission opening 18e. Consequently, even though gas delivery openings 18b are disposed in a circumferential face of inflator housing 18a, the inflation gas can be guided smoothly into gas inflow portion 14 through gas emission opening 18e of diffuser 18c. As a result, even though air bag 11 is folded along the long and narrow area from the inside of the front pillar, which is narrow in width, to the roof side rail, inflation gas flows into air bag 11 and inflates air bag 11 smoothly.

In this embodiment, gas inflow portion 14 is connected to inflator 18 by being clamped onto diffuser 18c. Thus, gas inflow portion 14 does not have to be made long enough to cover the entire length of inflator housing 18a. In other words, gas inflow portion 14 can be made short and the cost of the material used to make air bag 11 can be reduced.

Figure 10:
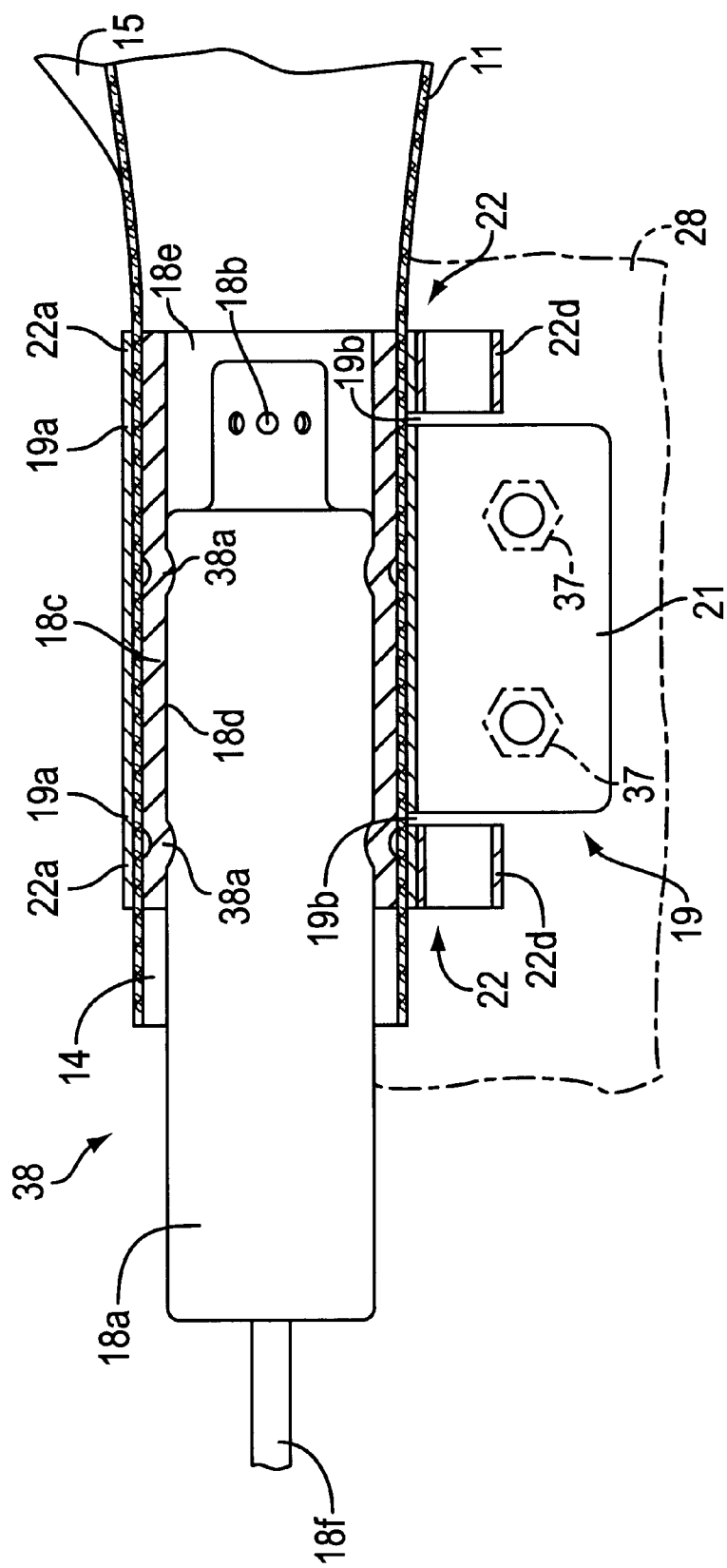
FIG. 10 is an enlarged longitudinal sectional view showing a modified inflator.

In the air bag device M1 of this embodiment, inflator 18 is made by press-fitting mating portion 18d of cylindrical diffuser 18c onto inflator housing 18a. An inflator 38, however, of the type shown in FIG. 10 may be used instead.

In inflator 38, mating portion 18d at the lower end of diffuser 18c is attached to inflator housing 18a by being plastically deformed by roller caulking. With this type of construction it is possible to increase the strength of the attachment of air bag 11 to inflator 38. This is so because depressions 38a are formed in mating portion 18d of diffuser 18c. If clamping surface 22a are disposed in the areas of depressions 38a when the internal diameters of clamping surface 22a are reduced, the frictional resistance to movement of gas inflow portion 14 with respect to air bag 11 is increased and gas inflow portion 14 is less likely and more difficult to detach from inflator 38.

Inflators 18 and 38 of this embodiment both have an inflator housing 18a that is provided with a diffuser 18c. An inflator having no diffuser 18c and consisting of an inflator housing 18a only, however, may be used instead, and, in this case, gas inflow portion 14 is fitted directly to the outer circumferential surface of inflator housing 18a.

Figure 11:
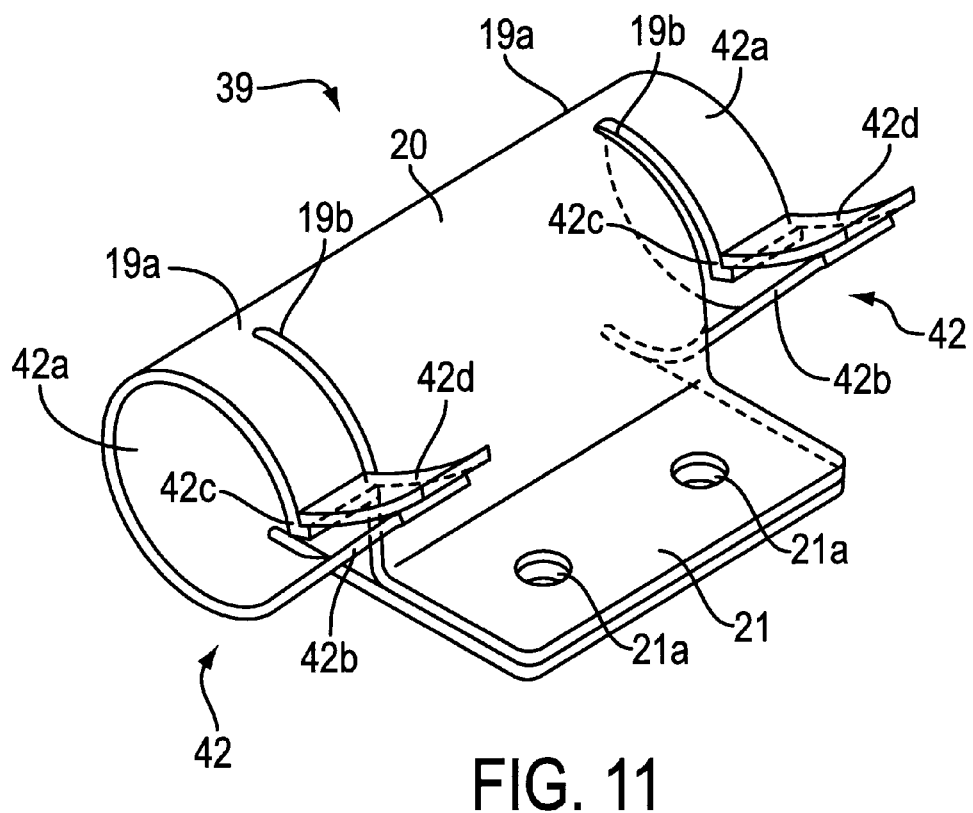
FIG. 11 is a perspective view showing a modified mounting bracket.
Figure 12:
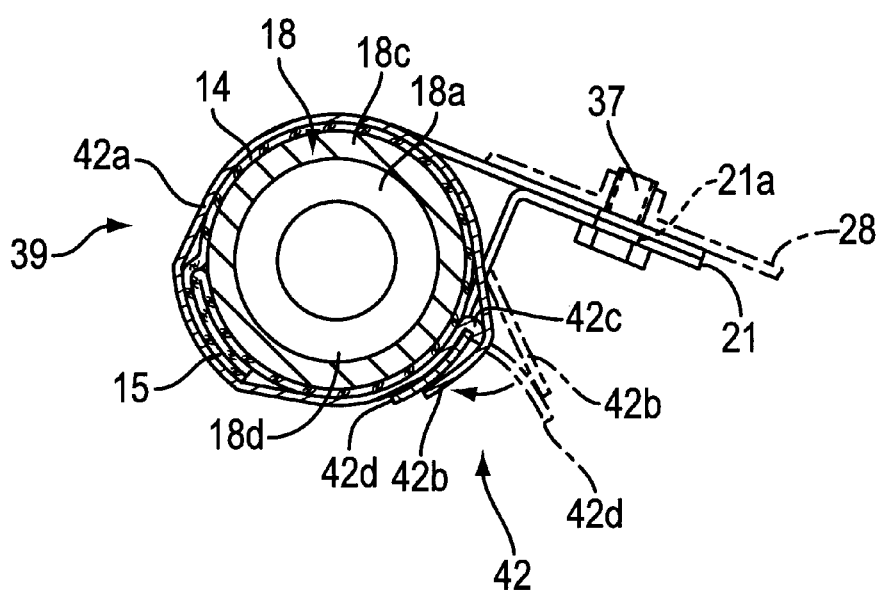
FIG. 12 is a cross-sectional view of the mounting bracket shown in FIG. 11.

Also, although in this embodiment an example wherein mounting bracket 19 has two clamping surfaces 22a was shown, mounting bracket 19 may have only one clamping surface 22a. Furthermore, a mounting bracket 39 of the type shown in FIGS. 11 and 12 may be used. Mounting bracket 39 has a tubular portion 20 and a mounting portion 21, which are similar to those of mounting bracket 19. Substantially cylindrical holding portion 42 is provided. At the ends of tubular portion 20 of mounting bracket 39. Connecting portion 19a having slits 19b are disposed between holding portion 42 and tubular portion 20. Each holding portion 42 has a clamping surface 42a and a linking portion 42d. Clamping surface 42a is shaped like a belt curled to form a tube and has a substantially cylindrical inner circumferential surface. Each clamping surface 42a has an end portion 42b that extends outward and an end portion 42c that is positioned on the inner side of end portion 42c. Linking portion 42d is made of sheet metal and links together end portion 42b and 42c. When mounting bracket 39 is used, linking portion 42d are bent over so as to pull the sides of end portion 42b and thereby plastically deform clamping surface 42a. When this is done, the internal diameters of the inner circumferential surfaces of clamping surface 42a are reduced. By this arrangement, gas inflow portion 14 can be clamped to the outer circumferential surface of diffuser 18c.

In the above embodiment, an air bag device M1 that is installed so as to extend from the front pillar to the roof side rail of a vehicle interior has been described. The side air bag device may also be constructed so that the air bag extends from a quarter pillar at the rear of the vehicle interior or a center pillar to the roof side rail. In this design, inflator 18 is disposed in a lower portion of the quarter pillar or center pillar below the belt line BL and gas inflow portion 14 extends from inflator 18.

A side air bag device M2 of another embodiment of the invention is disposed in a vehicle interior and extends along the edge of a door opening W from below a front pillar to the rear end of a roof side rail, as shown in FIGS. 13–16. The side air bag device M2 has an air bag 51 and an inflator 58.

Air bag 51 is folded and fitted in the vehicle interior along the edge of the door opening W above the belt line BL (i.e., the line of the lower side of the window frame F in the door D). In other words, air bag 51 is fitted in a folded state along the front pillar and the roof side rail.

Figure 17:
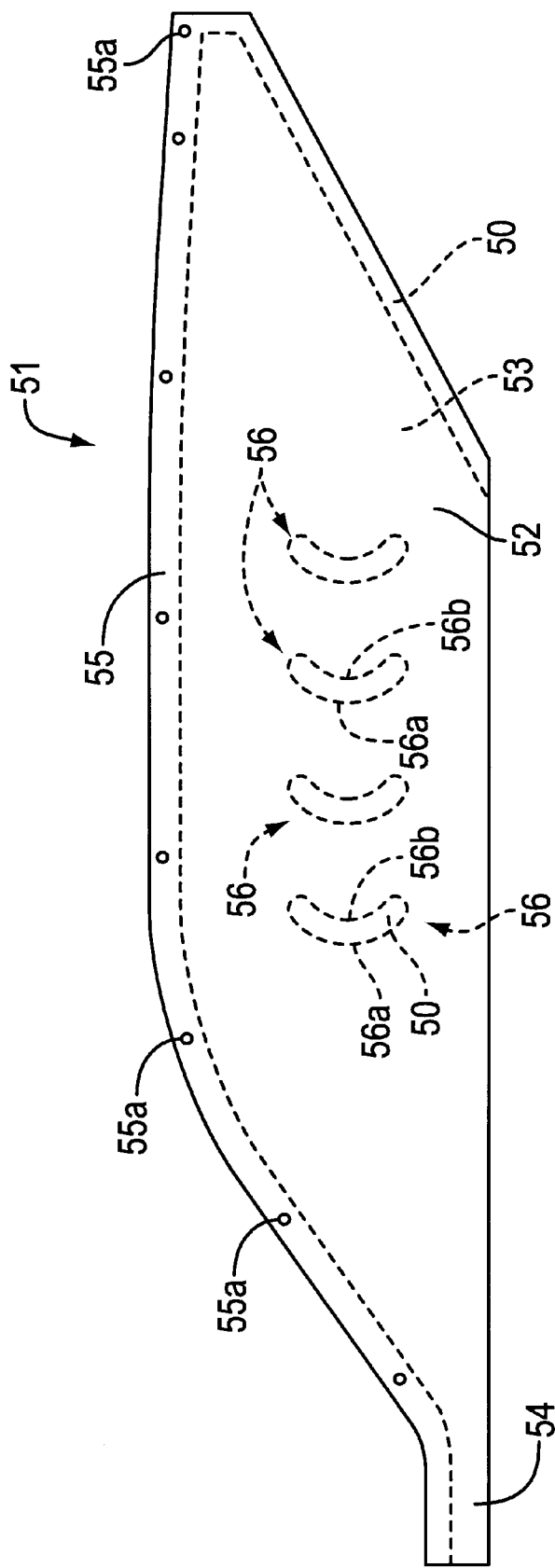
FIG. 17 is a front view showing the air bag upon inflation.

As shown in FIG. 17, air bag 51 has an inner side wall portion 52 and an outer side wall portion 53. The shape of air bag 51 when deployed is substantially that of a four-cornered flat bag. Air bag 51 also has in its lower side a substantially cylindrical gas inflow portion 54.

Air bag 51 is manufactured from a single sheet of cloth having the shape of a feather similar to that of the previous embodiment. Air bag 51 is made in the form of a bag by folding the cloth along its approximate centerline and by bonding its edges with an adhesive 50 such as a thermosetting silicon, urethane, or epoxy adhesive or a hot melt adhesive. Inner side wall portion 52 and outer side wall portion 53 that overlap on the upper edge side of the stitching along air bag 51 form a fixable portion 55, which can be fixed to the housing 28 of the vehicle. Fixable portion 55 has fixing holes 55a. The cloth of air bag 51 is made of a flexible woven fabric of polyamide, polyester, or the like.

Figure 16:
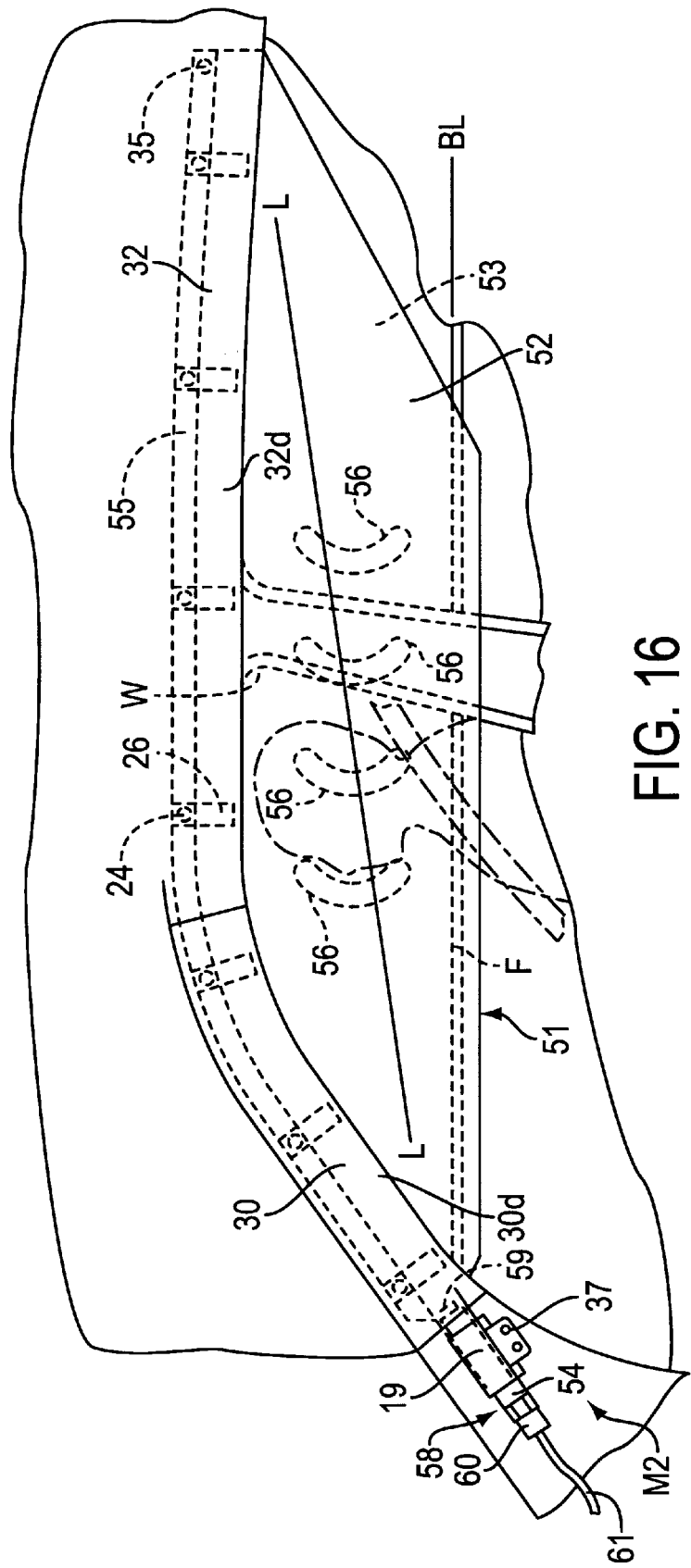
FIG. 16 is a view showing the side air bag device when operated.

Four bonded portions 56 for forming a tension line L—L are formed in the inflated air bag 51 as shown in FIGS. 16 and 17. In particular, each bonded portion 56 is formed by bonding together inner side wall portion 52 and outer side wall portion 53 with an adhesive 50.

Figure 13:
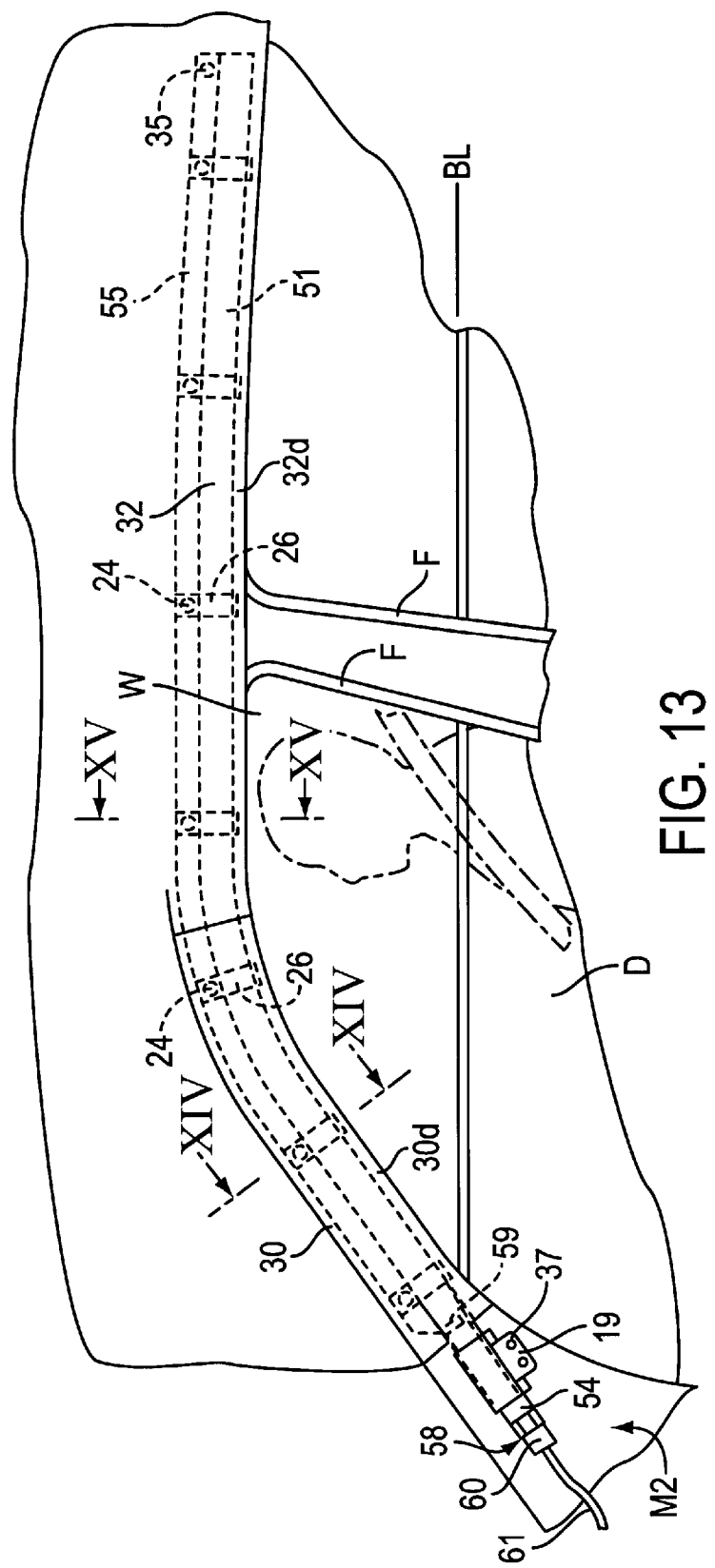
FIG. 13 is a view showing a side air bag device of another embodiment of the invention.
Figure 14:
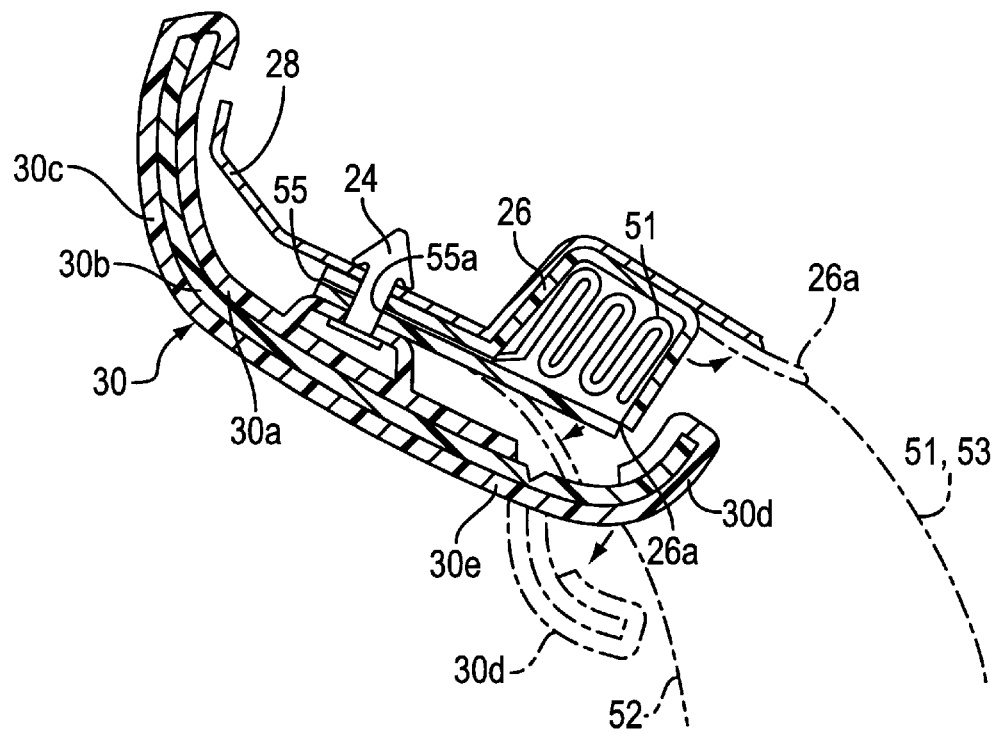
FIG. 14 is an enlarged sectional view along the line XIV—XIV in FIG. 13.
Figure 15:
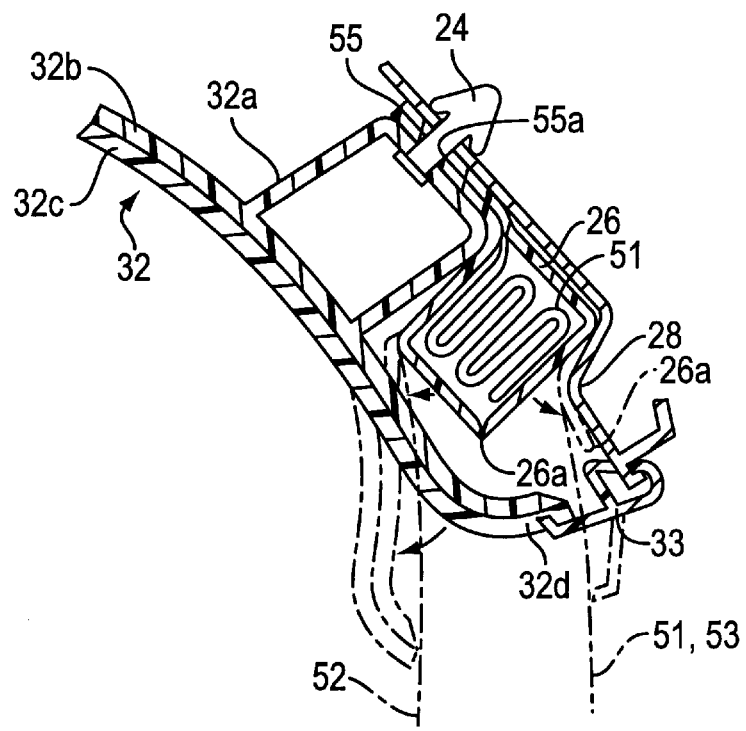
FIG. 15 is an enlarged sectional view along the line XV—XV in FIG. 13.

Air bag 51, like air bag 11, is folded in bellows form and is fitted along the edge of the door opening W using tie belts 26, as shown in FIGS. 13–15. And like air bag 11, air bag 51 is also covered by a closure 30 on the front pillar side and by a roof trim member 32 on the roof rail side.

Clips 24 for fastening closure 30 and roof trim member 32 to the housing 28 pass through tie belts 26 and fixing holes 55a in air bag 51. Clips 24 thus also perform the role of fixing air bag 51 to the housing 28. When air bag 51 inflates, an edge 32d of roof trim member 32 is pushed by air bag 51 and detaches from door trim 33.

A bolt 35 is screwed into the housing 28 and passes through a fixing hole 55a at the rear end of air bag 51. The rear end of air bag 51 is attached to the housing 28 by bolt 35 without the use of tie belt 26.

At the front end of air bag 51, tubular gas inflow portion 54 is attached to the housing 28 using a mounting bracket 19.

As shown in FIG. 13, inflator 58 is disposed in a lower portion of the front pillar below the belt line BL. Inflator 58 is made up of a substantially cylindrical inflator housing 59 and a substantially cylindrical tubular diffuser 60.

Figure 18:
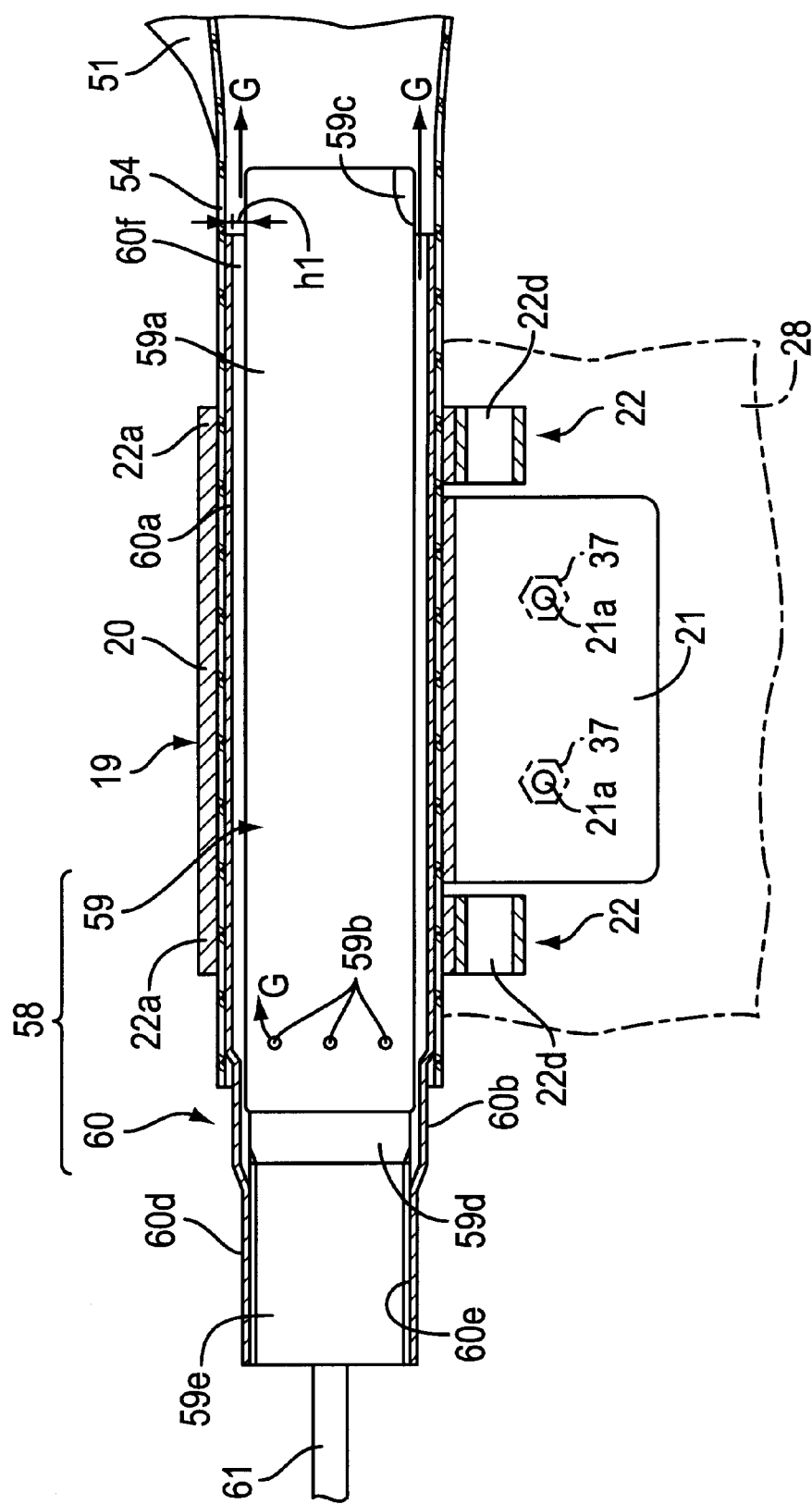
FIG. 18 is an enlarged longitudinal sectional view of the inflator area.

As shown in FIG. 18, inflator housing 59 has a cylindrical large-diameter portion 59a at its upper end and a small-diameter portion 59d at its lower end. Small-diameter portion 59d has a smaller diameter than large-diameter portion 59a and is concentric to large-diameter portion 59a. A plurality of gas delivery openings 59b through which inflation gas G can be discharged are uniformly spaced in the circumferential direction on the circumferential face of the lower end of large-diameter portion 59a. A male screw thread 59e is disposed below gas delivery openings 59b on the circumferential face of the end of small-diameter portion 59d. Also, one or more cutaway portions 59c are formed in the upper end of large-diameter portion 59a. Cutaway portions 59c form a gripping face that grips inflator housing 59 when diffuser 60 is being joined thereto. Lead wire 61 is provided and acts in much the same way as lead wire 18f.

Figure 19:
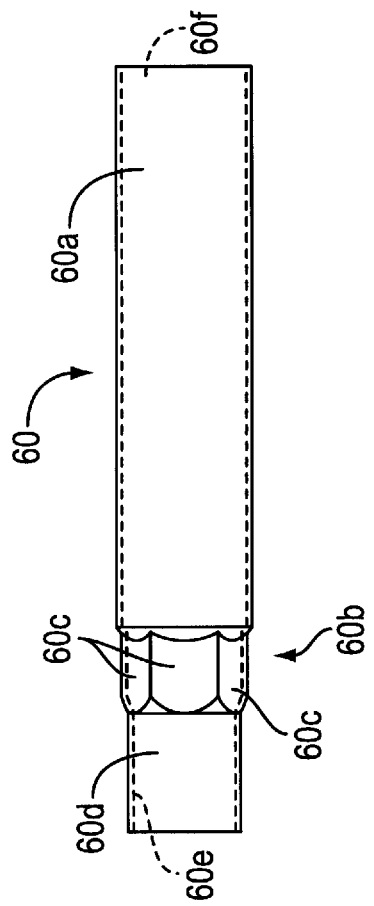
FIG. 19 is a front view of a diffuser used in the inflator.
Figure 20:
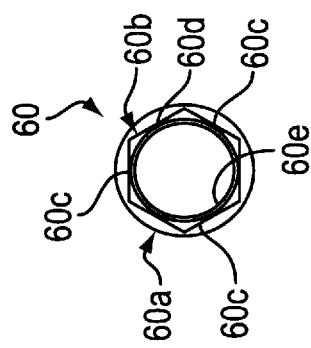
FIG. 20 is a side view of the diffuser shown in FIG. 19.

Diffuser 60 has a cylindrical large-diameter portion 60a, a small-diameter portion 60d, and an intermediate portion 60b. Small-diameter portion 60d is disposed at the lower end of diffuser 60. The upper end of large-diameter portion 60a forms a gas emission opening 60f. Small-diameter portion 60d is smaller in diameter than large-diameter portion 60a and is concentric with large-diameter portion 60a. Intermediate portion 60b is disposed between large-diameter portion 60a and small-diameter portion 60d. A female screw thread 60e is provided on the inner circumferential surface of small-diameter portion 60d. Female screw thread 60e mates with male screw thread 59e. Female screw thread 60e performs the role of a mating portion for fixing diffuser 60 to inflator housing 59. Intermediate portion 60b is shaped like a regular hexagonal tube, as shown in FIGS. 19 and 20. Intermediate portion 60b has flat gripping surfaces 60c that are gripped when diffuser 60 is connected to inflator housing 59. The length of diffuser 60 is selected so that when small-diameter portion 60d has been connected to small-diameter portion 59d, cutaway portion 59c at the end of inflator housing 59 is exposed. The internal diameter of large-diameter portion 60a at the upper end of diffuser 60 is selected such that when diffuser 60 has been attached to inflator housing 59 a gap h of about 2 mm is opened between the outer circumferential surface of large-diameter portion 59a and the inner circumferential surface of gas emission opening 60f.

Inflator 58 is assembled in the following manner. First, using cutaway portion 59c, inflator housing 59 is gripped in a jig. Using gripping surfaces 60c, diffuser 60 is gripped with a spanner or the like. Then, inflator 58 is assembled by screwing male thread 59e into female screw thread 60e, thereby fixing diffuser 60 to inflator housing 59.

Air bag 51 and inflator 58 are mounted to the housing 28 in the following way. First, gas inflow portion 54 is fitted around diffuser 60. Then, tubular portion 20 and holding portion 22 are fitted around gas inflow portion 54. Linking portion 22d are then plastically deformed by pinching them with pliers or the like. When this is done, the internal diameters of clamping surface 22a are reduced, and gas inflow portion 54, which has been fitted over cylindrical diffuser 60, is clamped so as to create a good seal with the outer circumferential surface of diffuser 60. Also, inflator 58 is held by holding portion 22 of mounting bracket 19. By screwing mounting bolts 37 into the housing 28 through mounting holes 21a, inflator 58 with gas inflow portion 54 fitted thereto can be easily mounted to the housing 28.

At the same time inflator 58 is being mounted to the housing 28 using mounting bracket 19, air bag 51 is folded and tied with tie belts 26. Then, using clips 24, bolts or other fastening devices, portion of air bag 51 other than gas inflow portion 54 is mounted to the housing 28.

When the air bag device M2 of this embodiment operates, inflation gas G is discharged through gas delivery openings 59b in inflator 58. When this happens, the inflation gas passes between the outer circumferential surface of large-diameter portion 59a and the inner circumferential surface of gas emission opening 60f and flows out from the upper end of inflator 58 into gas inflow portion 54. As the inflation gas G flows into air bag 51 through gas inflow portion 54, air bag 51 inflates. The inflating air bag 51 breaks breaking portion 26a of mounting belt 26. Also, air bag 51 pushes open door portion 30d of closure 30 and pushes open edge 32d of roof trim member 32 and inflates so as to block the door opening W.

In inflator 58, diffuser 60 is fixed to the outer circumferential surface of inflator housing 59 by mating screw threads 59e and 50e being joined together. In other words, the center axes of diffuser 60 and inflator housing 59 can be disposed concentrically. Because of this arrangement, the gap h between the outer circumferential surface of inflator housing 59 and the inner circumferential surface of diffuser 60 through which the inflation gas G flows can be made uniform along the outer circumferential surface of inflator housing 59. As a result, variation does not arise in either the direction of the flow of the inflation gas G through gas emission opening 60f, or the distribution of the amount of flow around inflator housing 59. Further, the inflation gas G can be made to flow out uniformly into gas inflow portion 54 of air bag 51 through the end of inflator 58.

Therefore, in this embodiment, even though air bag 51 is folded along the long and narrow area from the inside of the front pillar to the roof side rail, inflation gas flows into air bag 51 and inflates it smoothly. In particular, inflator 58 of this embodiment is of a type wherein gas delivery openings 59b are disposed in the outer circumferential face of the lower end of inflator housing 59 that is far from gas emission opening 60f. In this type of arrangement, inflation gas normally tends not to flow out through the upper end of the inflator uniformly. With this embodiment, however, it is possible to make the inflation gas G flowing out through the upper end of inflator 58 uniform and it is possible to make air bag 51 inflate smoothly.

Also, in inflator 58, diffuser 60 can be easily fixed to inflator housing 59 by just simply screwing together mating screw threads 59e and 60e. As a result, it is possible to reduce the labor and manufacturing cost of the side air bag device M2.

By using screw threads 59e and 60e, diffuser 60 is fixed to the outer circumferential surface of inflator housing 59 below gas delivery openings 59b. Because of this arrangement, it is possible to prevent leakage of inflation gas G through mating portion 60e and effective use of the inflation gas is achieved.

In this embodiment, gripping surfaces 59c and 60c are formed on the outer circumferential surfaces of inflator housing 59 and diffuser 60. These surfaces make it possible to grip inflator housing 59 and diffuser 60 when screwing together screw threads 59e and 60e. Because of this arrangement, it is possible to firmly grip cylindrical inflator housing 59 and cylindrical diffuser 60. Accordingly, the work of fixing the diffuser 60 to inflator housing 59 is easy and the labor and manufacturing cost of the side air bag device M2 is reduced.

Gripping surfaces 59c and 60c may be formed as a single flat surface. Also, the gripping surfaces may each be formed as a single protrusion or depression.

It should be understood that while embodiments and details of the subject invention have been described above, it would be apparent to those skilled in the art that various changes and modification can be made without departing from the scope of the subject invention, as defined by the claims below.

We claim:

1. A side air bag device in combination with an edge of a door opening comprising:

an air bag; and an inflator that supplies inflation gas to the air bag,
wherein the air bag includes a cloth bag that is installed in a folded state in a vehicle interior along the edge of the door opening so as to cover the door opening upon inflation, the air bag having a tubular gas inflow portion,
wherein said tubular gas inflow portion is sealed by being clamped to an outer surface of the inflator.

2. A side air bag device according to claim 1, further comprising a mounting bracket that connects the gas inflow portion to the inflator, the mounting bracket having a tubular clamping surface and a mounting portion that is fixable to a vehicle housing, the tubular clamping surface being fitted around the gas inflow portion that has been fitted over the inflator, an internal diameter of the tubular clamping surface being reduced so as to clamp the gas inflow portion onto the inflator.

3. A side air bag device according to claim 2, wherein the mounting bracket is made of sheet metal and includes a tubular portion, the mounting portion extending from the tubular portion, the tubular clamping surface having the shape of a belt and covering the inflator; the tubular portion comprising the tubular clamping surface and a linking portion that links the tubular clamping surface, and the internal diameter of the tubular clamping surface being reduced by plastically deforming the linking portion.

4. A side air bag device according to claim 2, wherein the mounting bracket is made of sheet metal and includes a tubular portion, the mounting portion extending from the tubular portion, the tubular clamping surface having the shape of a belt and covering the inflator, the tubular portion comprising the tubular clamping surface and a platelike linking portion that links together ends of the tubular clamping surface with ends of the tubular portion, which are spaced radially apart from one another, the platelike linking portion circumferentially overlapping the tubular portion, the internal diameter of the tubular clamping surface being reduced and the tubular clamping surface being plastically deformed by deforming the platelike linking portion.

5. A side air bag device according to claim 1, wherein the inflator comprises an inflation housing that has a gas delivery opening disposed in a circumferential face thereof and a tubular diffuser that has:

at one end thereof a mating portion that mates with the inflator housing, at another end thereof a gas emission opening that emits inflation gas, and an intermediate portion disposed between the mating portion and the gas emission opening so as to face the gas delivery opening.

6. A side air bag device according to claim 5, wherein the gas inflow portion is clamped onto an outer surface of the diffuser.

7. A side air bag device according to claim 5, wherein the mating portion of the diffuser is plastically deformed against the inflator housing so as to create an irregularity in an outer surface of the diffuser, and the gas inflow portion is clamped onto the outer surface of the diffuser where the irregularity is created.

8. A side air bag device in combination with an edge of a door opening comprising:

an air bag; and an inflator that supplies inflation gas to the air bag,
wherein the air bag includes a cloth bag that is installed in a folded state in a vehicle interior along the edge of the door opening so as to cover the door opening upon inflation, and
wherein the inflator comprises an inflator housing that includes a gas delivery opening in a circumferential face thereof and a tubular diffuser that includes:
at one end thereof a mating portion that mates with the inflator housing,
at another end thereof a gas emission opening that emits inflation gas, and
an intermediate portion disposed between the mating portion and the gas emission opening so as to face the gas delivery opening,
wherein the mating portion of the diffuser includes a female screw thread on an inner surface of the diffuser, the inflator housing includes a male screw thread on an outer surface thereof, the male screw thread being matable with the female screw thread, and the diffuser is fixed to the inflator housing by mating the male and female screw threads and wherein the intermediate portion of the diffuser provides a gas flow path between the outer circumferential surface of the inflator housing and the intermediate portion, in an area from the gas delivery opening to the gas emission opening, such that inflation gas flowing from the gas emission opening flows substantially uniformly around the inflator housing.

9. A side air bag device according to claim 8, further including gripping surfaces by which the inflator housing and the diffuser are gripped when the male and female screw threads are being mated, the gripping surfaces being formed on outer surfaces of the inflator housing and the diffuser.

10. A side air bag device according to claim 8, wherein the gas delivery opening is disposed on an end of the inflator housing that is opposite from the gas emission opening of the diffuser.

* * * * *